United States Patent [19]

Marshall

[11] Patent Number: 4,483,596
[45] Date of Patent: Nov. 20, 1984

[54] INTERFACE SUPPRESSION APPARATUS AND METHOD FOR A LINEAR MODULATOR

[75] Inventor: Sidney W. Marshall, Webster, N.Y.

[73] Assignee: Xerox Corporation, Stamford, Conn.

[21] Appl. No.: 353,726

[22] Filed: Mar. 1, 1982

[51] Int. Cl.³ .................... G02B 27/26; G02B 27/28
[52] U.S. Cl. .................................. 350/385; 350/356; 350/401; 350/403
[58] Field of Search .............. 350/356, 385, 401, 403

[56] References Cited

U.S. PATENT DOCUMENTS

| | | | |
|---|---|---|---|
| 3,301,625 | 1/1967 | Ashkin et al. | 350/150 |
| 3,440,424 | 4/1969 | Buhrer | 250/199 |
| 3,510,198 | 5/1970 | Pace | 350/157 |
| 3,684,350 | 8/1972 | Wentz | 350/150 |
| 3,722,982 | 3/1973 | Brandt | 350/385 |
| 4,019,151 | 4/1977 | Brueckner et al. | 330/4.3 |
| 4,053,763 | 10/1977 | Harney | 250/206 |
| 4,281,904 | 8/1981 | Sprague et al. | 350/356 |

Primary Examiner—Bruce Y. Arnold
Assistant Examiner—William Propp
Attorney, Agent, or Firm—Frederick E. McMullen

[57] ABSTRACT

In an electro-optic line printer of the type having a bit addressable linear modulator for modulating a sheet-like beam of light in response to pixel bits to expose the printer recording medium in line by line fashion. To suppress interference between the beam upper and lower sidebands, the beam is vertically polarized and a halfwave plate, disposed so that the axis thereof is at 45° to the fourier transform plane, is inserted into the path of one of the sidebands to change the polarization of the one sideband from vertical to non-interferring horizontal. In a second embodiment, a halfwave plate is inserted into the path of each sideband, the axes of the plates being such as to form a 45° angle therebetween whereby the sidebands are polarized at an angle of 90° to one another, avoiding interference therebetween.

10 Claims, 7 Drawing Figures

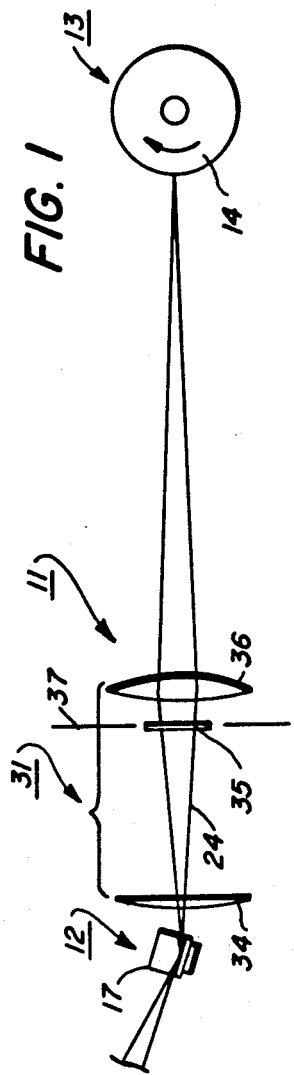
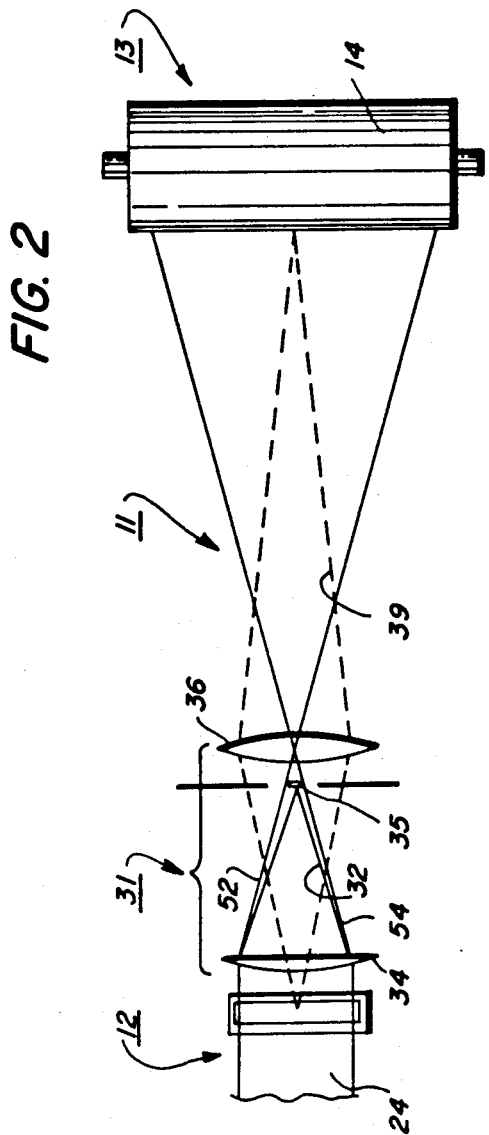
FIG. 1
FIG. 2

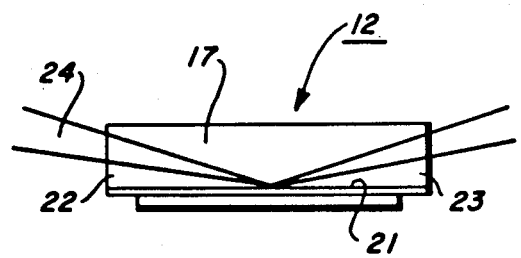
FIG. 3
FIG. 4
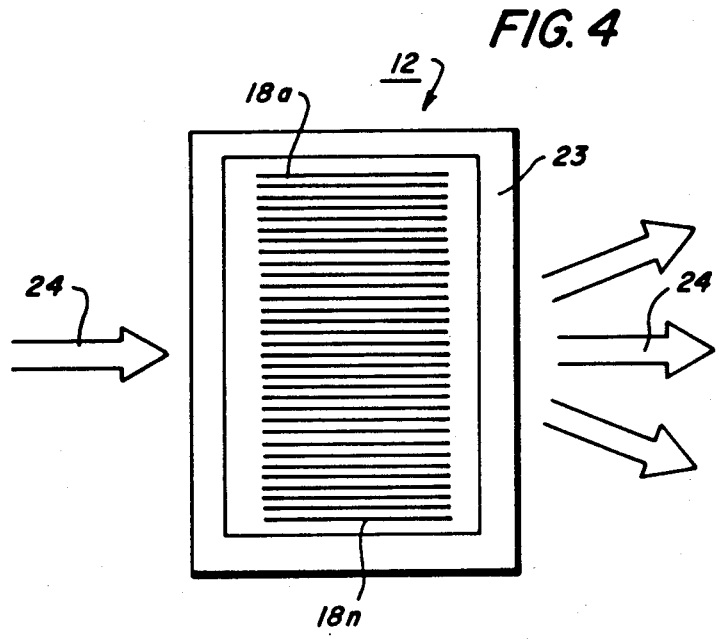
FIG. 5
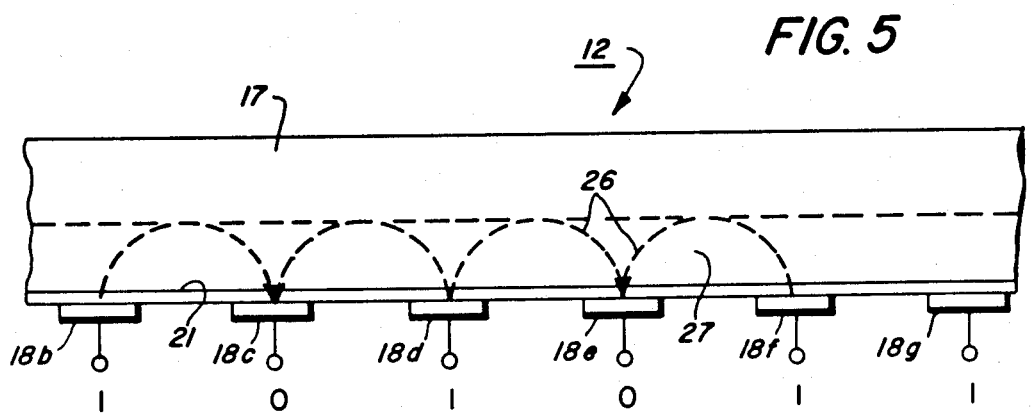

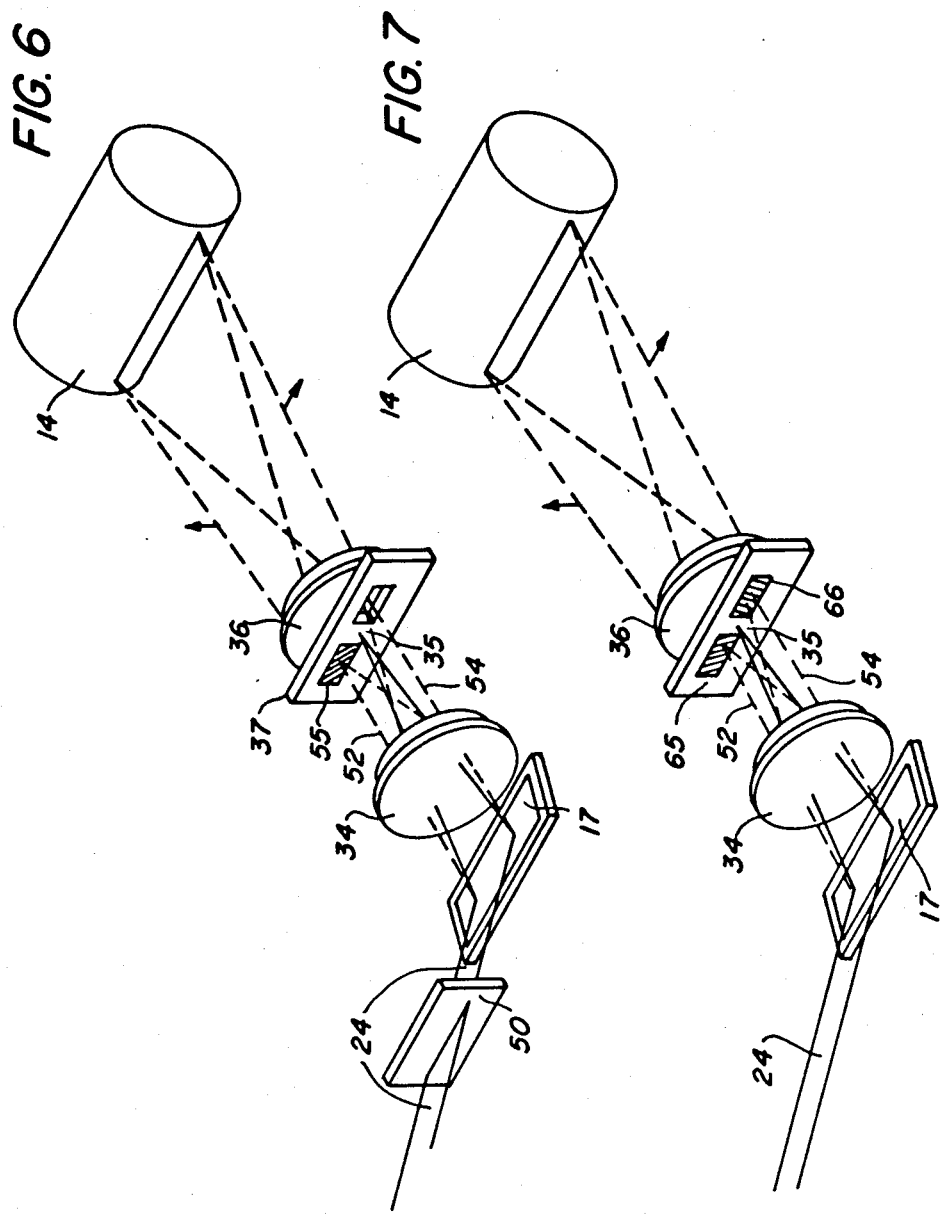

INTERFACE SUPPRESSION APPARATUS AND METHOD FOR A LINEAR MODULATOR

BACKGROUND OF THE INVENTION

This invention relates to bit addressable linear modulators and, more particularly, to method and apparatus for avoiding destructive interference between upper and lower sidebands of the modulator output beam.

Bit addressable linear modulators may be utilized with an electro-optic line printer as a means for converting image signals or pixels, representing the original image, to an image copy. A modulator of this type is disclosed in U.S. Pat. No. 4,281,904 and issued to R. A. Sprague et al on Aug. 4, 1981 for a "TIR Electro-Optic Modulator With Individually Addressed Electrodes".

In the aforementioned electro-optic printer, a photosensitive recording medium, such as xerographic photoreceptor, is exposed in an image configuration as the recording medium is advanced along an axis perpendicular to the direction of scan. For scanning purposes, a sheet-like collimated light beam derived from a suitable source such as a laser, is transmitted through the electro-optic modulator, such transmission being either along the modulator's optical axis for straight through transmission or at a slight angle relative to the modulator axis for total internal reflection. Concurrently therewith, image signals or pixels, which may be in the form of digital bits or analog signals are sequentially applied to the modulator electrodes. As a result, localized electric bulk or fringe fields are created within the electro-optic element in the immediate vicinity of any electrodes to which non-reference image signals are applied. Where such fields occur, localized variations in the refractive index of the modulator substrate take place and these variations in the refractive index of the substrate in turn modulate the phase front or polarization of the light beam passing therethrough in accordance with the image signal content. The phase front modulated light beam is thereafter converted into a light beam having a correspondingly modulated intensity profile which is impinged onto the recording medium to create an image representative of the image signals. The image so created is thereafter processed xerographically to provide a visible rendition or copy of the original image.

SUMMARY OF THE INVENTION

One problem with modulators of the type referred to above is the modulators inability to turn on an entire scan line of image pixels without leaving dark areas between the pixels. Such dark areas as the image, which are caused by destructive interference between the upper and lower sidebands around the beam stop, cannot be eliminated by the more conventional methods of defocusing the optics or by introducing optical aberrations.

To obviate this problem, there is provided an electro-optic modulator for modulating a sheet-like collimated light beam in accordance with pixel bits representative of an image original to selectively produce a zero order beam and at least one pair of side order beams; beam stop means interposed in the path of the zero order beam to prevent passage thereof; optical means for imaging the side beam pair onto a recording medium; the modulator having means for selectively altering on a pixel bit by pixel bit basis the phase of the transmitted light; and means to prevent destructive interference between the pair of side order beams.

There is further provided a method of preventing dark areas between image pixels along an image exposure line derived from pixel bits representative of the original image comprising the steps of generating a substantially flat sheet like beam of light; modulating the beam simultaneously across the width of the beam to produce zero order and upper and lower sideband beam components in accordance with the pixel bits; focusing said upper and lower sideband components onto a recording medium to form the image pixels on the medium while blocking the zero order beam component; and modifying the polarization of at least one of the upper and lower sideband beam components so that the polarization of the upper and lower sideband beam components are orthogonal to one another whereby destructive interference and consequent formation of the dark areas is avoided.

BRIEF DESCRIPTION OF THE DRAWINGS

Still other features and advantages of this invention will become apparent when the following detailed description is read in conjunction with the attached drawings, in which:

FIG. 1 is a schematic side view of an exemplary electro-optic line printer incorporating a bit addressable linear modulator;

FIG. 2 is a schematic bottom plan view of the electro-optic line printer shown in FIG. 1;

FIG. 3 is an enlarged view of the bit addressable linear modulator used in the electro-optic line printer of FIGS. 1 and 2;

FIG. 4 is an enlarged bottom plan view of the modulator shown in FIG. 3;

FIG. 5 is a further enlarged and fragmentary schematic end view of the modulator shown in FIG. 3 illustrating the interaction between the fringing fields and the light beam;

FIG. 6 is an isometric view of the electro-optic line printer shown in FIGS. 1-5 modified to incorporate the interference suppression means of the present invention; and FIG. 7 is an isometric view of an electro-optic printer shown in FIGS. 1-5 modified to incorporate an alternate interference suppression means in accordance with the tenets of the present invention.

DETAILED DESCRIPTION OF THE ILLUSTRATED EMBODIMENTS

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Referring particularly to FIGS. 1 and 2 of the drawings, there is shown an exemplary electro-optic line printer 11 of the type having a multi-gate bit addressable linear modulator 12 for exposing the printer photosensitive recording medium 13 in an image configuration. The recording medium 13 is depicted as being a photoconductively coated xerographic drum 14 which is rotated (by means not shown) in the direction of the arrow. It nevertheless will be evident that there are other xerographic and non-xerographic recording media that could be used, including photoconductively coated xerographic belts and plates, as well as photosensitive film and coated paper which may be supplied as web or cut sheet stock. The recording medium 13 should, therefore, be visualized in the generalized case as being a photosensitive medium which is exposed in an image configuration while advancing in a cross line or line pitch direction relative to the modulator 12.

As best shown in FIGS. 3-5, modulator 12 includes an electro-optic substrate 17, with a plurality of individually addressable electrodes 18a-18n. For the Total Internal Reflection (TIR) mode of operation illustrated, the substrate 17 typically is a y cut crystal which may for example be $LiNbO_3$ having a polished reflecting surface 21 which is integral with and disposed between polished input and output faces 22 and 23, respectively. Electrodes 18a-18n are intimately coupled to the electro-optic substrate 17 adjacent the reflecting surface 21 and are distributed across essentially the full width of substrate 17 in parallel paired relationship. Typically, the electrodes 18a-18n are approximately 1-30 microns wide and are on centers which are more or less equidistantly separated to provide a generally uniform interelectrode gap spacing of 1-30 microns. Furthermore, the electrodes 18a-18n extend generally parallel to the optical axis of substrate 17, each electrode projecting a substantial length along the substrate optical axis.

Referring to FIGS. 1-5 for a review of the operation of the line printer 11, a sheet-like collimated beam of light 24 from a suitable source, such as laser 16 is transmitted through the input face 22 of the electro-optic substrate 17 at a grazing angle of incidence relative to the reflecting surface 21. The light beam 24 is brought to a wedge shaped focus (by means not shown) at approximately the centerline of the surface 21 and is totally reflected therefrom for subsequent transmission through the output face 23 of substrate 17. As will be seen, light beam 24 illuminates substantially the full width of the substrate 17 and as will appear is phase front modulated while passing therethrough in accordance with the image signals or pixels applied to adjacent electrodes 18a-18n.

More particularly, to modulate the light beam 24, successive sets of digital or analog image signals or pixel bits representing successive lines of the original image, are sequentially applied to the individually addressable electrodes 18a-18n. The image signals are generated to produce localized fringe fields 26 within an interaction region 27 of the electro-optic substrate 17 defined by each electrode gap so that any time there is a voltage difference between consecutive electrodes, the pixel therebetween is on. Where no voltage difference exists between consecutive electrodes, the pixel is off. As a result, localized variations in the refractive index of the electro-optic substrate 17 widthwise of the interaction region 27 occur, such refractive index variations faithfully representing the image signals appearing on the electrodes 18a-18n at any given point in time. Consequently, the phase front of the light beam 24 is spatially and serially modulated line by line in accordance with the image signals as the light beam 24 passes through the interaction region 27 of the electro-optic substrate 17.

To expose the recording medium 13 in an image configuration, Schlieren central dark field imaging optics 31 are provided which are optically aligned between the modulator 12 and the recording medium 13 to image the modulated light beam onto the recording medium 13. As will be understood, the imaging optics 31 convert the spatial phase front modulation of the light beam 24 into a correspondingly modulated intensity profile and additionally, provide any magnification that is required to obtain an image of a desired width. The illustrated imaging optics 31 include a field lens 34 for focusing the zero order diffraction components 32 of the phase front modulated light beam 24 onto a central stop 35 at the fourier transfer plane 37 and an imaging lens 36 for imaging the scattered higher order diffraction components or sidebands 52, 54 onto the recording medium 13. The field lens 34 is optically aligned between the modulator 12 and stop 35 so that substantially all of the zero order components 32 of the light beam 24 are blocked by stop 35. The higher order diffraction components 52, 54 of the light beam 24, referred to herein as upper and lower sidebeams, scatter around the stop 35 and are collected by the imaging lens 36 which, in turn, causes them to fall onto the image plane of modulator 12 defined by the recording medium 13. Of course, other optical arrangements may be used to convert the phase front of the phase modulated light beam output by modulator 12 into a light beam having a correspondingly modulated intensity profile.

As indicated in FIG. 2 by the broken line 39, each pair of electrodes 18a-18n cooperates with the electro-optic substrate 17 of modulator 12 and the phase-sensitive readout optics 31 to effectively define a local modulator for creating a pixel at a unique, spatially predetermined position along each line of the image, the sum total of the pixels forming a unique image line. As will be understood, the number of electrodes 18a-18n determine the total number of pixels that can comprise an image line. By sequentially applying successive sets of image signals, which are supplied as a serial data stream, to these local modulators while the recording medium 13 is advancing in a cross line direction relative to the modulator 12, successive lines of pixels are printed.

Modulators such as linear modulator 12 suffer from an inability to turn on adjacent pixels without the presence of dark areas between the pixels. Such dark areas are caused by destructive interference between the upper and lower sidebands 52, 54 at beam stop 35. This effect cannot be eliminated by defocusing or introducing optical aberrations.

To obviate this problem, and referring particularly to FIG. 6, where like numbers refer to like parts, a plane polarizer 50 oriented in a plane perpendicular to the plane of the light beam 24 output by laser 16 is disposed upstream of modulator 12. Polarizer 50 serves to vertically polarize light beam 24.

To prevent sidebands 52, 54 from interferring with one another, a halfwave plate 55, the axis of which is set at 45° to the plane of light beam 24, is placed in the path of one of the sidebands, i.e. sideband 52, at the fourier transform plane 37. Halfwave plate 55 functions to turn or rotate the vertically polarized sideband 52 through 90° from vertical to horizontal, making it impossible for sidebands 52, 54 to interfere with one another. As a result, dark areas between pixels along the image line are avoided.

In the embodiment shown in FIG. 7, where like numbers refer to like parts, the plane polarizer of FIG. 6 is dispensed with, and two halfwave plates 65, 66 are used. In that arrangement, halfwave plate 65 is disposed in the path of sideband 52 at the fourier transform plane 37 while halfwave plate 66 is disposed in the path of sideband 54 at the fourier transform plane. Halfwave plates 65, 66 are positioned such that the axis of plate 65 is at 45° to the axis of plate 66. As a consequence, sidebands 52, 54 are oriented at right angles to each other regardless of the angle of polarization of the incoming beams.

In this connection, to assure operational efficiency of the FIG. 7 embodiment, the sidebands 52, 54 are both retarded by halfwave plates to provide a symmetrical system in which the length of the path for both sidebands 52, 54 is equal. While inexpensive commercially available lasers are identified as unpolarized, such lasers in fact radiate several linearly polarized beams at different frequencies. The embodiment of FIG. 7 prevents destructive interference between each sideband component emitted by an unpolarized laser. Since the various beam components are typically separated by approximately 500 MHz., it is possible to neglect any beating between components for systems with integration times greater than 20 nanoseconds. This permits the FIG. 7 embodiment to be used with unpolarized lasers whose polarization directions are not aligned with the system.

While the invention has been described with reference to the structure disclosed, it is not confined to the details set forth, but is intended to cover such modifications or changes as may come within the scope of the following claims.

I claim:

1. In combination,
   an electro-optic modulator for modulating a sheet-like, collimated light beam in accordance with pixel bits representative of an image original to selectively produce a zero order beam and at least one pair of side order beams in response to said pixel bits;
   beam stop means interposed in the path of said zero order beam to prevent passage thereof;
   optical means for imaging said pair of side order beams onto a recording medium;
   said modulator including means for selectively altering on a pixel bit by pixel bit basis the phase of the transmitted light; and
   means to prevent destructive interference between said pair of side order beams.

2. The combination according to claim 1 in which said destructive interference prevention means includes means disposed in the path of at least one of said pair of side order beams to change the angle of polarization of said one side order beam with respect to the angle of polarization of the other of said side order beams to thereby prevent destructive interference between said pair of side order beams.

3. The combination according to claim 2 in which said means disposed in the path comprises a halfwave plate disposed in the path of each of said pair of said side order beams, the axis of the halfwave plate in one of said side order beams being at 45° to the axis of the halfwave plate in the other of said side order beams to thereby prevent destructive interference between said pair of side order beams.

4. The combination according to claim 1 in which said destructive interference preventing means comprises
   (a) a beam polarizer interposed in the path of said beam between the light beam source and said modulator for vertically polarizing said light beam, and
   (b) a halfwave plate interposed in the path of one of said pair of side order beams for rotating said vertically polarized side beam to horizontal to thereby prevent destructive interference between said side order beams.

5. A method of preventing dark areas between image pixels along an image exposure line derived from pixels bits representative of the original image comprising the steps of:
   (a) generating a substantially flat sheet like beam of light;
   (b) modulating said beam simultaneously across the width of said beam to produce zero order and upper and lower sideband beam components in accordance with said pixel bits;
   (c) focusing said upper and lower sideband components onto a recording medium to form said image pixels on said medium while blocking said zero order beam component; and
   (d) changing the polarization angle of at least one of said upper and lower sideband beam components so that the polarization angle of said one sideband beam component is orthogonal to the polarization angle of the other sideband beam component whereby destructive interference and consequent formation of said dark areas is avoided.

6. The method according to claim 5 including the step of changing the polarization angle of both said upper and lower sideband beam components so that the polarization angles of said upper and lower sideband beam components are at right angles to one another.

7. The method according to claim 5 including the steps of
   (a) vertically polarizing said beam of light before said beam is modulated, and
   (b) rotating one of said upper and lower vertically sideband components so that said one sideband components is horizontally polarized.

8. The method according to claim 5 including the step of interposing a halfwave plate in the path of each of said upper and lower sideband beam components such that the angle between the halfwave plate in the path of said upper beam component and the halfwave plate in the path of said lower beam component is 45 degrees.

9. The method according to claim 5 including the steps of:
   (a) vertically polarizing said beam of light before said beam is modulated, and
   (b) interposing a halfwave plate in the path of one of said upper and lower sideband beam components such that the angle between the optical axis of said plate and said vertically polarized beam is 45 degrees.

10. The method according to claim 5 including the step of modifying the polarization of both said upper and lower sideband beam components so that said upper and lower sideband beam components remain orthogonal regardless of the polarization of said beam of light.

* * * * *